US006853712B2

(12) United States Patent
Toyoda et al.

(10) Patent No.: US 6,853,712 B2
(45) Date of Patent: Feb. 8, 2005

(54) COMMUNICATION APPARATUS CONNECTED TO AN EXCHANGE NETWORK HAVING A SERVICE OF NOTIFYING IDENTIFICATION INFORMATION OF A CALLING PARTY

(75) Inventors: Hisashi Toyoda, Yokohama (JP); Toshio Kenmochi, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/197,592

(22) Filed: Jul. 18, 2002

(65) Prior Publication Data

US 2002/0181682 A1 Dec. 5, 2002

Related U.S. Application Data

(62) Division of application No. 08/712,625, filed on Sep. 11, 1996, now Pat. No. 6,522,736.

(30) Foreign Application Priority Data

Sep. 22, 1995 (JP) .............................. 7-244495
Oct. 5, 1995 (JP) .............................. 7-258677

(51) Int. Cl.[7] .......................... H04M 1/56; H04M 15/06
(52) U.S. Cl. ........................... 379/142.07; 379/142.17; 379/142.12; 379/93.23
(58) Field of Search .................. 379/88.19–88.21, 379/93.23, 142.01, 142.04, 142.06, 142.07, 142.12, 142.17

(56) References Cited

U.S. PATENT DOCUMENTS

| 4,932,048 | A | | 6/1990 | Kenmochi et al. ........ 379/88.13 |
| 5,467,385 | A | | 11/1995 | Reuben et al. .............. 379/142 |
| 5,471,522 | A | | 11/1995 | Sells et al. ............... 379/93.11 |
| 5,546,447 | A | | 8/1996 | Skarbo et al. .............. 379/142 |
| 5,550,900 | A | * | 8/1996 | Ensor et al. |
| 5,590,184 | A | * | 12/1996 | London |
| 5,623,537 | A | | 4/1997 | Ensor et al. .................. 379/67 |
| 5,644,629 | A | * | 7/1997 | Chow |
| 5,696,815 | A | | 12/1997 | Smyk ......................... 379/142 |
| 5,734,706 | A | * | 3/1998 | Windsor et al. |
| 6,064,732 | A | | 5/2000 | Pezzullo et al. ............ 379/396 |

FOREIGN PATENT DOCUMENTS

JP          6-52914           6/1994

* cited by examiner

Primary Examiner—Duc Nguyen
(74) Attorney, Agent, or Firm—Fitzpatrick, Cella, Harper & Scinto

(57) ABSTRACT

A communication apparatus for an exchange network having a service of notifying the telephone number of a caller during a call-receiving operation can recognize respective callers of past call-receiving operations. During a call-receiving operation, a communication partner's telephone number detection unit detects the telephone number (identification information) of the caller, and stores the detected telephone number in a nonvolatile RAM (random access memory). The RAM can store a plurality of sets of identification information, which are recorded and output in the form of a list by a recording unit.

12 Claims, 11 Drawing Sheets

FIG.5

\* \* \* \* NOTIFICATION OF RECORDING OF CALL-RECEIVING OPERATIONS \* \* \* \* ['95.5.30.8:30~18:00]

| TIME OF CALL-RECEIVING OPERATIONS | NAME OF COMMUNICATION PARTNER | TELEPHONE NUMBER |
|---|---|---|
| 8 : 43 | ×××ELECTRIC CORP. | 03 - ××× - ×××× |
| 8 : 51 | ××××TRADING | 03 - ××× - ×××× |
| 8 : 57 | | 03 - ××× - ×××× |
| 9 : 05 | | 03 - ××× - ×××× |
| 9 : 16 | TARO TANAKA | 03 - ××× - ×××× |
| 9 : 33 | HANAKO TANAKA | 03 - ××× - ×××× |
| 9 : 49 | ×××ELECTRONICS CORP. | 03 - ××× - ×××× |
| 10 : 13 | ××BANK | 03 - ××× - ×××× |
| 10 : 22 | | 03 - ××× - ×××× |
| 10 : 45 | ×××INDUSTRIES | 045 - ××× - ×××× |
| 11 : 04 | | 044 - ××× - ×××× |
| 11 : 14 | ××ELECTRONICS | 03 - ××× - ×××× |
| 11 : 26 | | 03 - ××× - ×××× |
| 11 : 37 | ICHIRO HASHIMOTO | 03 - ××× - ×××× |
| 11 : 54 | HIROSHI NAKAMURA | 03 - ××× - ×××× |
| 12 : 06 | | 052 - ××× - ×××× |
| 13 : 03 | SUSUMU HONDA | 0427 - ××× - ×××× |
| 13 : 17 | | 03 - ××× - ×××× |
| 13 : 23 | ××ELECTRIC INDUSTRY | 03 - ××× - ×××× |
| 13 : 31 | ×××TECHNICS | 03 - ××× - ×××× |
| 13 : 44 | ×××CORP. | 03 - ××× - ×××× |
| 13 : 48 | | 045 - ××× - ×××× |
| 14 : 23 | JUN'ICHI SAKAMOTO | 03 - ××× - ×××× |
| 14 : 56 | ×××DESIGN | 03 - ××× - ×××× |
| 15 : 32 | ×××LABORATORY | 044 - ××× - ×××× |
| 16 : 21 | | 03 - ××× - ×××× |
| 16 : 38 | RYOJI NOGUCHI | 03 - ××× - ×××× |
| 17 : 02 | ××MOTORS | 045 - ××× - ×××× |
| 17 : 20 | | 03 - ××× - ×××× |
| 17 : 25 | | 03 - ××× - ×××× |

COMMUNICATION APPARATUS CONNECTED TO AN EXCHANGE NETWORK HAVING A SERVICE OF NOTIFYING IDENTIFICATION INFORMATION OF A CALLING PARTY

This application is a division of Application Ser. No. 08/712,625, filed on Sep. 11, 1996 now U.S. Pat. No. 6,522,736.

BACKGROUND OF THE INVENTION

1. Field of the Invention

This invention relates to a communication apparatus connected to a line of an exchange network having a service of notifying a called party of identification information of a calling party (caller).

2. Description of the Related Art

Recently, for example, in some foreign countries, there has been provided a service of an exchange network in which a called party is notified of identification information (i.e., the telephone number) of a caller (hereinafter termed a "caller ID service"). A telephone set dealing with such a caller ID service has a small display unit capable of displaying information comprising about one or two lines, the display unit itself comprising, for example, an LCD (liquid crystal display). When a call has been received, the telephone set displays the identification information (telephone number) of the received caller on the display unit, so that the operator of the called party can identify the caller. Japanese Patent Publication No. 6-52914 (1994) relates to such a telephone set. The telephone set of this patent displays the identification number of a caller received at during the call-receiving operation, and resets the display before the next call-receiving operation.

In this telephone set, however, only the identification information of a caller is displayed during the call-receiving operation, and the operator merely determines whether or not to respond to the call-receiving operation.

Hence, conventionally, for example, even if the operator wants to know the history of call-receiving operations from a plurality of callers, he can know only the caller of the immediately preceding call-receiving operation. That is, the operator cannot know the history of call-receiving operations, for example, in a day or during his absence.

Systems have also been proposed in which, for example, another terminal, such as a telephone set, a personal computer or the like, is connected to a facsimile apparatus, so that a single telephone line is shared for conversation through the telephone set and facsimile communication, or for facsimile communication and data communication by the computer.

When, for example, the function of the caller ID service is provided in the facsimile apparatus of the above-described system, although the telephone number of the caller is displayed on the display unit of the facsimile apparatus when the facsimile apparatus responds to a call receiving operation, the other terminal, such as the telephone set, the personal computer or the like, cannot receive the identification information of the caller.

No problem arises when the facsimile apparatus itself responds to the call-receiving operation and facsimile communication is performed in that state. However, when communication is switched to the telephone set or the personal computer after the facsimile apparatus has responded, the other terminal, such as the telephone set, the personal computer or the like, cannot recognize the identification information of the caller even though the identification information of the caller has been transmitted from the switchboard.

SUMMARY OF THE INVENTION

The present invention has been made in consideration of the above-described problems.

It is an object of the present invention to provide an improved communication apparatus.

It is another object of the present invention to make it possible to easily recognize callers from a plurality of call-receiving operations by storing a plurality of sets of identification information of the callers received from an exchange network during the call-receiving operations and outputting the stored plurality of sets of identification information.

It is still another object of the present invention to make it possible to easily recognize a caller by outputting the telephone number and the name data of the caller received from an exchange network by referring to the name data of callers which have been registered in advance.

It is yet another object of the present invention to determine, in a communication apparatus connected to a line of an exchange network having the function of notifying the identification information of a caller, and sharing the line with another terminal, whether communication by the apparatus itself is to be performed or communication by the other terminal is to be performed in response to a call-receiving operation, and notifying the other terminal of the identification information of the caller detected during the call-receiving operation when communication by the other terminal is to be performed in response to the call-receiving operation.

According to one aspect, the present invention which achieves these objectives relates to a communication apparatus connected to an exchange network having a service of notifying identification information of a caller, comprising reception means for receiving the identification information during a call-receiving operation, storage means for storing a plurality of sets of identification information received by the reception means, and output means for outputting the plurality of sets of identification information stored in the storage means.

According to another aspect, the present invention which achieves these objectives relates to a method of outputting identification information of a caller in a communication apparatus connected to an exchange network having a service of notifying the identification information, comprising the steps of receiving the identification information during a call-receiving operation, storing the received identification information and storing and holding a plurality of sets of identification information, and outputting the plurality of sets of identification information which have been stored and held.

According to still another aspect, the present invention which achieves these objectives relates to a communication apparatus, connected to a line of an exchange network having a function of notifying identification information of a caller, and sharing the line with another terminal, comprising detection means for detecting identification information of a caller during a call-receiving operation from the exchange network, determination means for determining whether communication by the apparatus itself is to be performed or communication by the other terminal is to be performed in response to the call-receiving operation, and notification means for notifying, when performing communication by the other terminal is to be performed in response to the call-receiving operation, the other terminal of the identification information of the caller detected by the detection means.

The foregoing and other objects, advantages and features of the present invention will become more apparent from the following detailed description of the preferred embodiments taken in conjuction with the accompanying drawings.

BRIEF DESCRIPTION OF THE DRAWINGS

FIG. 5 is a table illustrating a list of notification of recording of call-receiving operations;

DETAILED DESCRIPTION OF THE PREFERRED EMBODIMENTS

Preferred embodiments of the present invention will now be described in detail with reference to the drawings.

Figure 1:
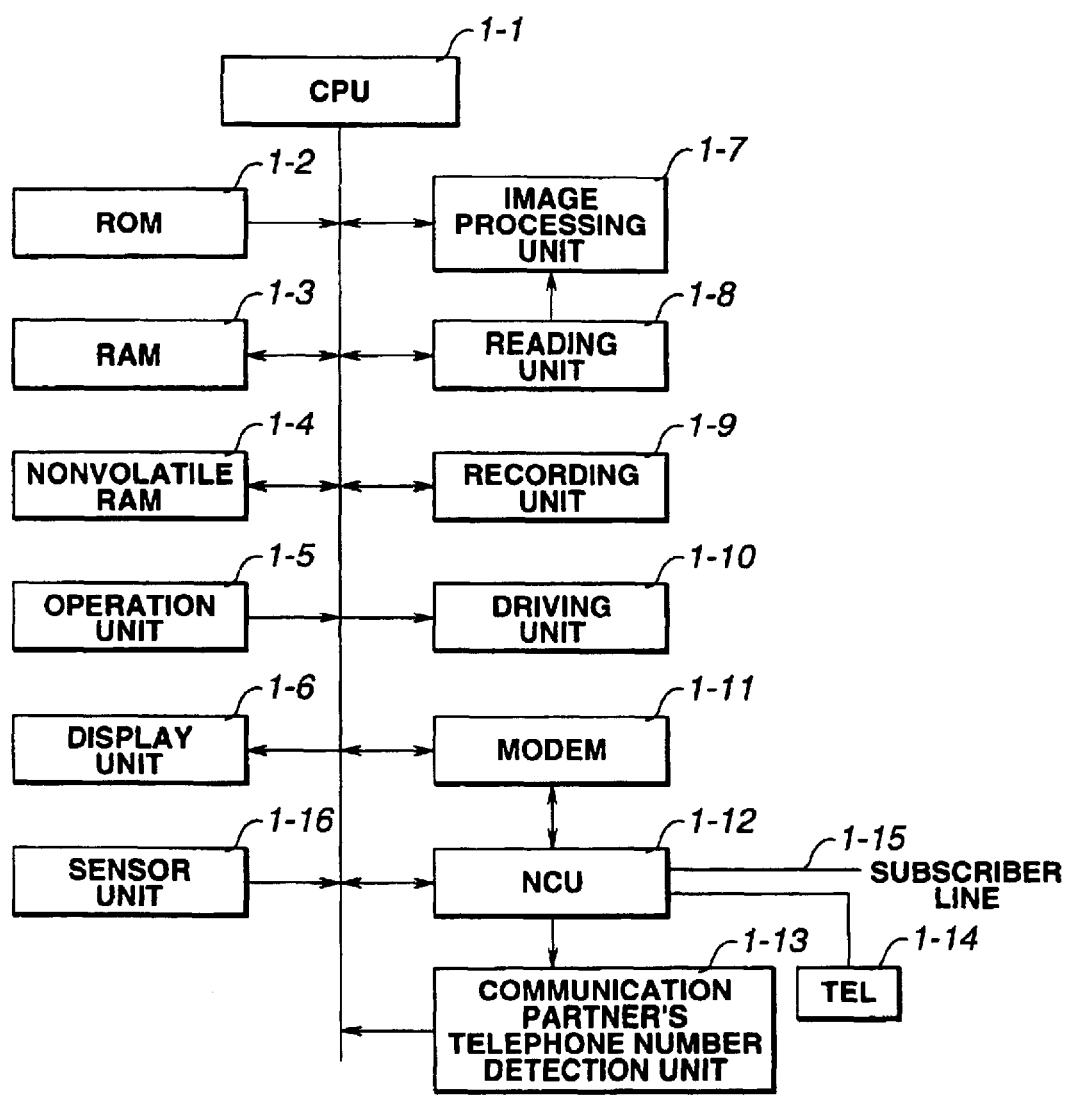
FIG. 1 is a block diagram illustrating the configuration of a facsimile apparatus according to a first embodiment of the present invention.

FIG. 1 is a block diagram illustrating the configuration of a facsimile apparatus according to a first embodiment of the present invention.

In FIG. 1, a CPU (central processing unit) 1-1 controls the entire facsimile apparatus, i.e., a RAM (random access memory) 103, a nonvolatile RAM 104, an operation unit 1-5, a display unit 1-6, an image processing unit 1-7, a reading unit 1-8, a recording unit 1-9, a driving unit 1-10, a modem 1-11, an NCU 1-12, and a sensor unit 1-16, in accordance with programs stored in a ROM (read-only memory) 1-2.

A description will now be provided of the respective units.

The RAM 1-3 stores data obtained by processing an image read by the reading unit 1-8 using the image processing unit 1-7, and image data recorded by the recording unit 1-9, and also stores binary data, obtained by modulating a signal using the modem 1-11, to be output from a subscriber line 1-15 via the NCU 1-12. The RAM 1-3 is also used for storing binary data obtained by demodulating an analog signal input from the subscriber line 1-15 via the NCU 1-12 using the modem 1-11.

The nonvolatile RAM 1-4 comprises an SRAM (static RAM) backed up by a battery or the like, and stores data, such as the telephone number of each apparatus in communication, the abbreviation of each user, and the like, and the result of communication. The nonvolatile RAM 1-4 also registers the telephone number and the name of each communication partner to be compared with the received telephone number. The processing of the comparison will be described later in detail. When registering the above-described items, type information indicating whether the registered number is the number of a facsimile or the number of a telephone (conversation) is also stored. The nonvolatile RAM 1-4 stores the telephone number and the name of each communication partner, the time of each call-receiving operation, and the like, and outputs and transfers the stored data to the recording unit 1-9 in response to the operator's instruction or at a set time.

The operation unit 1-5 comprises start keys for transmission, reception and the like, mode keys, each for assigning an operation mode, such as fine, standard or the like, for an image to be transmitted, a copy key for a copying operation, a stop key for stopping the operation, a received-data output key (to be described later), and the like.

The CPU 1-1 detects the state of depression of each of these keys, and controls the respective units in accordance with the detected state.

The display unit 1-6 comprises a dot-matrix-type LCD and an LCD driver, and performs various kinds of displays based on controls from the CPU 1-1.

The image processing unit 1-7 comprises a clock-signal supply circuit for controlling the reading unit 1-8, a peak holding circuit, a shading correction circuit, an A/D (analog-to-digital) conversion circuit, a DMA (direct memory access) controller and the like. The image processing unit 1-7 performs binary-coding, 16-gradation, or 64-gradation image processing of image data read by the reading unit 108, and transfers the processed image data to the RAM 1-3.

The reading unit 108 comprises photoelectric conversion means, such as a CCD (charge-coupled device), a contact-type image sensor (CS) or the like, and sequentially transfers image data obtained by reading an original using the CCD or the CS to the image processing unit 1-7 under the control of the CPU 1-1.

The recording unit 1-9 comprises a DMA controller, a B4/A4-size thermal print head or a BJ (bubble-jet) printer head, a general-purpose IC (integerated circuit) and the like. The recording unit 1-9 takes out recording data stored in the RAM 1-3 under the control of the CPU 1-1, and prints the data in the form of a hard copy.

The driving unit 1-10 comprises a stepping motor for driving feeding and discharging rollers of the reading unit 108 and the recording unit 1-9, gears for transmitting the driving force of the motor, a driver circuit for controlling the motor, and the like.

The modem 1-11 comprises V.34, V.32, V.32bis, V.17, V.29, V.27ter, V.23 and V.21 (H,L) modems, and a clock-signal generation circuit connected to these modems. The modem 1-11 modulates data to be transmitted which are stored in the RAM 1-3 under the control of the CPU 1-1, and outputs the modulated data to the subscriber line 1-15 via the NCU 1-12.

The modem 1-11 also receives an analog signal from the subscriber line 1-15 via the NCU 1-12, and stores data obtained by demodulating and binary-coding the signal in the RAM 1-3.

The NCU 1-12 comprises a DC catch circuit, an AC catch circuit, a Ci-signal (ringing-signal) detection circuit, two-line/four-line conversion circuit and the like, and connects the subscriber line 1-15 to the modem 1-11.

The handset (telephone set) 1-14 is also connectable to the NCU 1-12.

A communication partner's telephone number detection unit 1-13 detects the telephone number of the communication partner generated in a Ci signal by the switchboard. The unit 1-13 catches the AC component of the generated signal with an impedance of 600 ohms to detect the telephone number from the generated signal.

The subscriber line 1-15 is a public telephone line connected to the NCU 1-12.

The sensor unit 1-16 comprises a recording-sheet-width sensor, a recording-sheet-presence sensor, an original-width sensor and an original-presence sensor, and detects the states of the original and the recording sheet under the control of the CPU 1-1.

Figure 2:
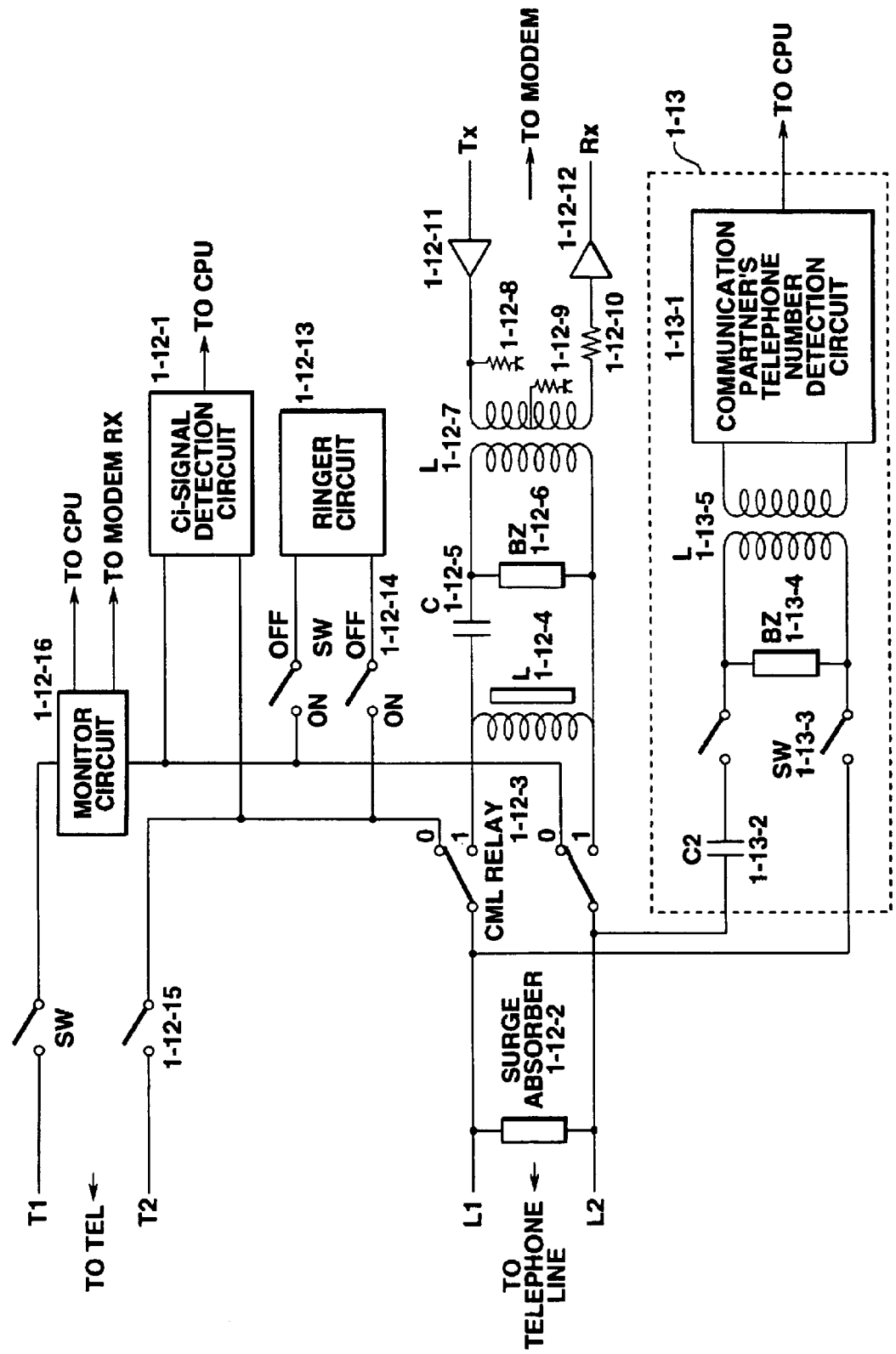
FIG. 2 is a block diagram illustrating the detailed configuration of an NCU (network control unit) shown in FIG. 1.

FIG. 2 is a block diagram illustrating the details of the NCU 1-12 and the communication partner's telephone number detection unit 1-13. A description will now be provided with reference to FIG. 2.

Reference numeral 1-12-1 represents a circuit for detecting a Ci signal indicating a call-receiving operation from the switchboard. The circuit 1-12-1 notifies the CPU 1-1 of the detection of the Ci signal. A surge absorber 1-12-2 for removing external noise is inserted between lines. Reference numeral 1-12-3 represents a CML relay for switching the line to the telephone set or the modem. Reference numeral 1-12-4 represents a RET coil for performing DC catching of the line.

There are also shown a capacitor 1-12-5, a varistor 1-12-6, a hybrid transformer 1-12-7 for dividing the line into a primary side and a secondary side, resistors 1-12-8, 1-12-9 and 1-12-10, operational amplifiers 1-12-11 and 1-12-12, a ringer circuit 1-12-13 ringing in response to a Ci signal, a switch 1-12-14 for switching on/off between the line and the ringer circuit, and a switch 1-12-15 for separating the telephone set from the line.

The modem 1-11 monitors a conversation signal through a monitor circuit 1-12-16, which also detects conversation current and notifies the CPU 1-1 of the hook state of the telephone set 1-14.

There are also shown a communication partner's telephone number detection circuit 1-13-1, a capacitor 1-13-2 for performing AC catching of the line, a switch 1-13-3 for separating the line from the communication partner's telephone number detection circuit, a varistor 1-13-4 for protecting the line, and a transformer 1-13-5 for dividing the line into a primary side and a secondary side.

Figure 3:
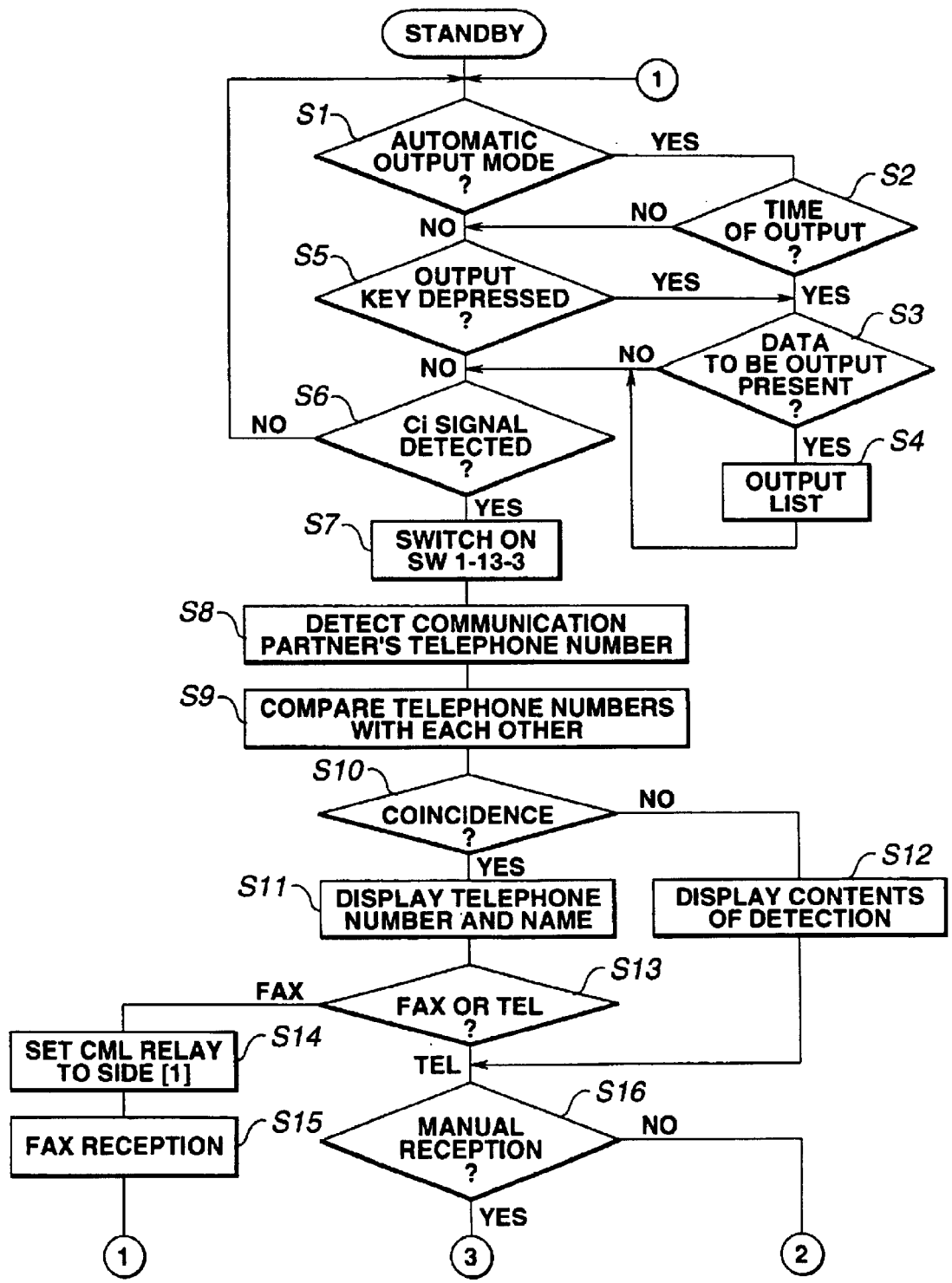
FIGS. 3 and 4 are flowcharts illustrating operations in the first embodiment.
Figure 4:
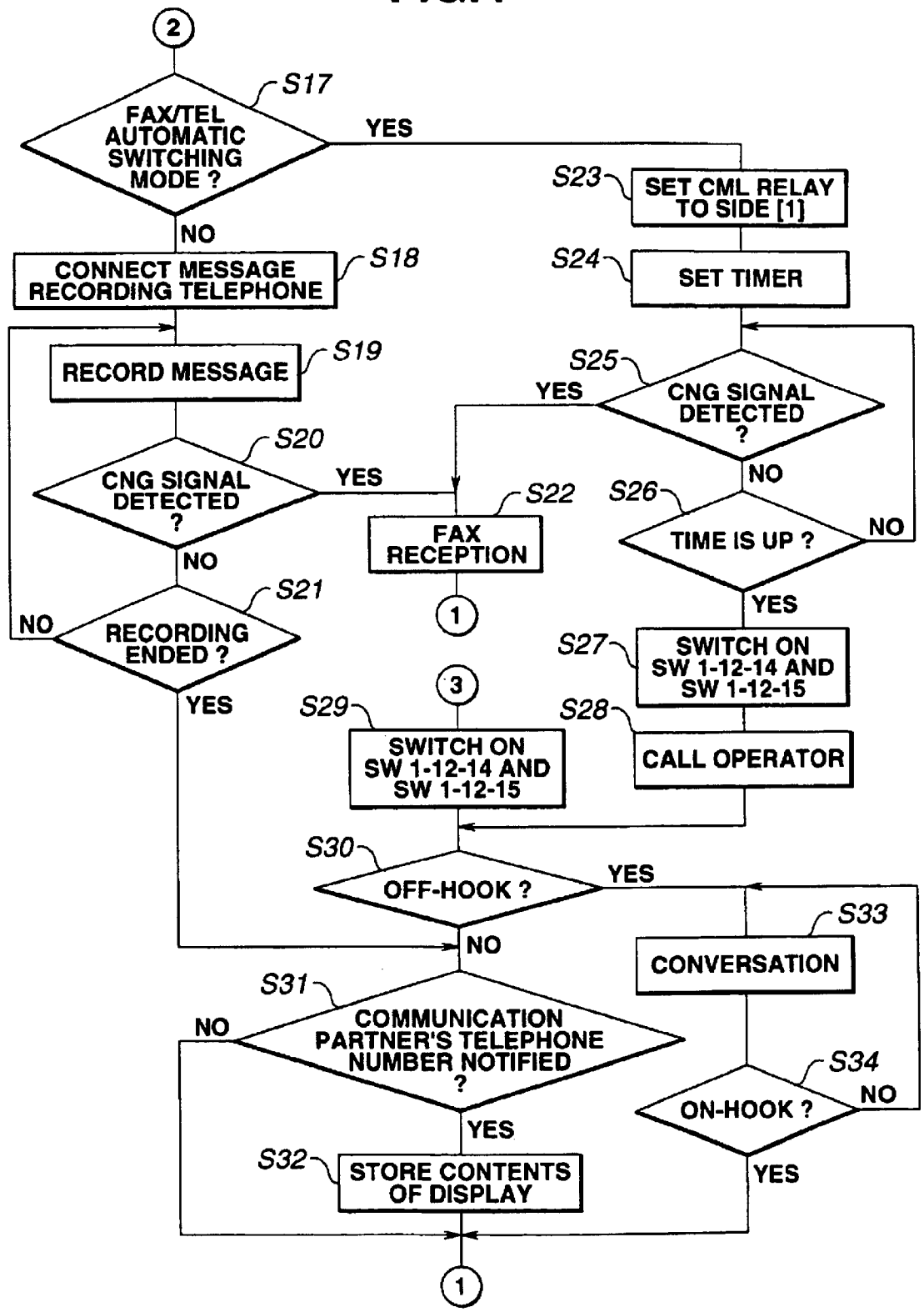

Next, the operation of the facsimile apparatus of the first embodiment will be described with reference to the circuit diagram shown in FIG. 2 and the flowcharts shown in FIGS. 3 and 4.

In a standby state, the facsimile apparatus switches off the SW 1-13-3, SW 1-12-4 and SW 1-12-15 shown in FIG. 2, and initializes the CML relay 1-12-3 to the side [0]. In this state, even if a Ci signal enters from the line, the facsimile apparatus and the connected telephone set do not ring.

In step S1, it is determined if the output mode of call-receiving recording data is set to an automatic output mode. If the result of the determination is affirmative, the process proceeds to step S2, where it is determined if the current time reaches the set time of output. If the result of the determination in step S2 is affirmative, the process proceeds to step S3, where it is determined if call-receiving data to be output is present.

If the result of the determination in step S3 is affirmative, the process proceeds to step S4, where the list of the telephone numbers and the names of communication partners. and the times of call-receiving operations is printed by the recording unit 1-9. The process then proceeds to step S6, where a Ci signal is detected.

If the result of the determination in step S1 or S2 is negative, the process proceeds to step S5, where it is determined if the call-receiving-data output key has been depressed. If the result of the determination in step S5 is negative, the process proceeds to step S6, where a Ci signal is detected.

If the result of the determination in step S5 is affirmative, the process proceeds to step S3, where it is determined if call-receiving data to be output is present. If the result of the determination in step S3 is affirmative, the process proceeds to step S4, where the list of the telephone numbers and the names of communication partners and the times of call-receiving operations (see FIG. 5) is printed by the recording unit 1-9. The process then proceeds to step S6, where a Ci signal is detected.

The above-described steps are looped until a Ci signal is detected in step S6.

When a Ci signal from the line has been detected in step S6, the process proceeds to step S7, where the switch SW 1-13-3 is switched on to connect the communication partner's telephone number detection circuit 1-13-1 to the line. In step S8, the communication partner's telephone number is detected. In step S9, the detected communication partner's telephone number is compared with telephone numbers which have been registered in advance.

If the detected telephone number coincides with one of the registered telephone numbers, the process proceeds to step S11, where the telephone number and the name of the communication partner is displayed on the display unit 1-6. If the detected telephone number does not coincide with any of the registered telephone numbers, the process proceeds to step S12, where the contents of the detection, i.e., a notification of either the telephone number of the communication partner, the absence of notification of the telephone number, the use of a public telephone, or an incapability of notification of the telephone number, are displayed.

After performing the display in step S11, the process proceeds to step S13, where it is determined whether the telephone number is registered in the nonvolatile RAM 1-4 as a number for facsimile or as a number for telephone. If the number is registered as the number for facsimile, the apparatus is set to an automatic reception mode for any reception mode (automatic reception, manual reception, FAX/TEL automatic switching, a message-recording telephone mode or the like), and the CML relay is set to the side [1] in step S14. In step S15, known facsimile reception is performed, and the process returns to the standby state.

If the telephone number is registered as the number for telephone in step S13, or after the contents of detection have been displayed in step S12, the process proceeds to step S16, where it is determined if the reception mode set through the operation unit 105 is a manual reception mode. If the result of the determination in step S16 is affirmative, the process proceeds to step S29, where switches SW 1-12-14 and SW 1-12-15 are switched on to connect the line to the ringer circuit of the communication apparatus and to the exterior telephone set instead of catching the line. Thus, the communication apparatus and the exterior telephone set ring in response to a Ci signal from the line. The operator can thereby notice a call-receiving operation from the line.

In step S30, it is determined if the operator has off-hooked the receiver of the exterior telephone set. If the result of the determination in step S30 is affirmative, the process proceeds to step S33, where ordinary conversation can be performed. After the conversation, the process proceeds to step S34, where it is determined if the operator has on-hooked the receiver of the exterior telephone set. If the result of the determination in step S34 is affirmative, the process returns to the standby state.

If the result of the determination in step S30 is negative, the process proceeds to step S31, where it is determined if the communication partner's telephone number has been notified. If the result of the determination in step S31 is affirmative, the process proceeds to step S32, where the time of the call-receiving operation and the telephone number and the name displayed on the display unit 1-6 (only when these items are displayed in step S11) are stored in the nonvolatile RAM 1-4, and the process returns to the standby state.

When, in step S31, the communication partner's telephone number has not been notified due to any one of the absence of notification of the telephone number, the use of a public telephone, and an incapability of notification of the telephone number, the process returns to the standby state.

If the result of the determination in step S16 is negative, the process proceeds to step S17, where it is determined if the apparatus is set to a FAX/TEL automatic switching mode. If the result of the determination in step S17 is affirmative, the process proceeds to step S23, where the CML relay is set to the side [1] in order to catch the line. Next, in step S24, a value of 5 seconds is set to the timer. In step S25, it is determined if a CNG signal which is a facsimile signal is detected. If the result of the determination in step S25 is affirmative, the process proceeds to step S22, where facsimile reception is performed, and the process then returns to the standby state.

If the result of the determination in step S25 is negative, the process proceeds to step S26, where it is determined if the time of the timer set in step S24 is up. The determination of the detection of a CNG signal in step S25 is repeated until the time is up.

If the result of the determination in step S26 is affirmative, the process proceeds to step S27, where the switches SW 1-12-14 and SW 1-12-15 are switched on. Then, in step S28, the operator is called using sound, display or the like. Then, in step S30, it is determined if the operator has off-hooked the exterior telephone set. If the result of the determination in step S30 is affirmative, the process proceeds to step S33, where ordinary conversation can be performed. After the conversation has been completed, the process proceeds to step S34, where it is determined if an on-hook state is provided. If the result of the determination in step S34 is affirmative, the process returns to the standby state.

If the result of the determination in step S30 is negative, the process proceeds to step S31, where it is determined if the communication partner's telephone number has been notified. If the result of the determination in step S31 is affirmative, the process proceeds to step S32, where the time of the call-receiving operation and the telephone number and the name displayed on the display unit 1-6 (only when these items are displayed in step S11) are stored in the nonvolatile RAM 1-4, and the process returns to the standby state.

When, in step S31, the communication partner's telephone number has not been notified due to any one of the absence of notification of the telephone number, the use of a public telephone, and an incapability of notification of the telephone number, the process returns to the standby state.

If the result of the determination in step S17 is negative, the operation is started by setting the reception mode to a message-recording-telephone mode. That is, in step S18, the switches SW 1-12-14 and SW 1-12-15 are switched on to connect the the line to the message recording telephone. Then, in step S19, the message recording telephone catches the line, and starts to record the communication partner's message.

While executing the operation of recording the communication partner's message in step S19, in step S20, it is determined if a CNG signal has been detected. If the result of the determination in step S20 is negative, the process proceeds to step S21, where it is determined if the recording has been completed. The determination of the detection of a CNG signal is repeated until the result of the determination in step S21 becomes affirmative.

If the result of the determination in step S20 is affirmative, the process proceeds to step S22, where facsimile reception is performed. Upon completion of the facsimile reception, the process returns to the standby state.

If the result of the determination in step S21 is affirmative, the process proceeds to step S31, where it is determined if the communication partner's telephone number has been notified. If the result of the determination in step S31 is affirmative, the process proceeds to step S32, where the time of the call-receiving operation and the telephone number and the name displayed on the display unit 1-6 (only when these items are displayed in step S11) are stored in the nonvolatile RAM 104, and the process returns to the standby state.

When, in step S31, the communication partner's telephone number has not been notified due to any one of the absence of notification of the telephone number, the use of a public telephone, and an incapability of notification of the telephone number, the process returns to the standby state.

In a service of the switchboard, the name of the communication partner is notified in addition to the telephone number. Accordingly, in step S8, the name data of the communication partner is detected. When the name data of the communication partner has been detected, the telephone number and the name of the communication partner which have been detected. are displayed in step S11 as well as in step S12.

FIG. 5 illustrates a list of notification of recording of call-receiving operations.

The first embodiment of the present invention has now been described in detail, in which a list of call-receiving operations is automatically output at a preset time. In a modification of the first embodiment, in an automatical output mode, such a list may be automatically output when at least a predetermined number of call-receiving operations have been stored. Alternatively, the list may be output at any call-receiving operation in an automatical output mode.

Although an example of outputting the record of call-receiving operations from the recording unit 1-9 of the facsimile apparatus as a hard copy has been described, the record of call-receiving operations may be output on a host computer, such as a personal computer or the like, and may be displayed on a display unit.

Figure 6:
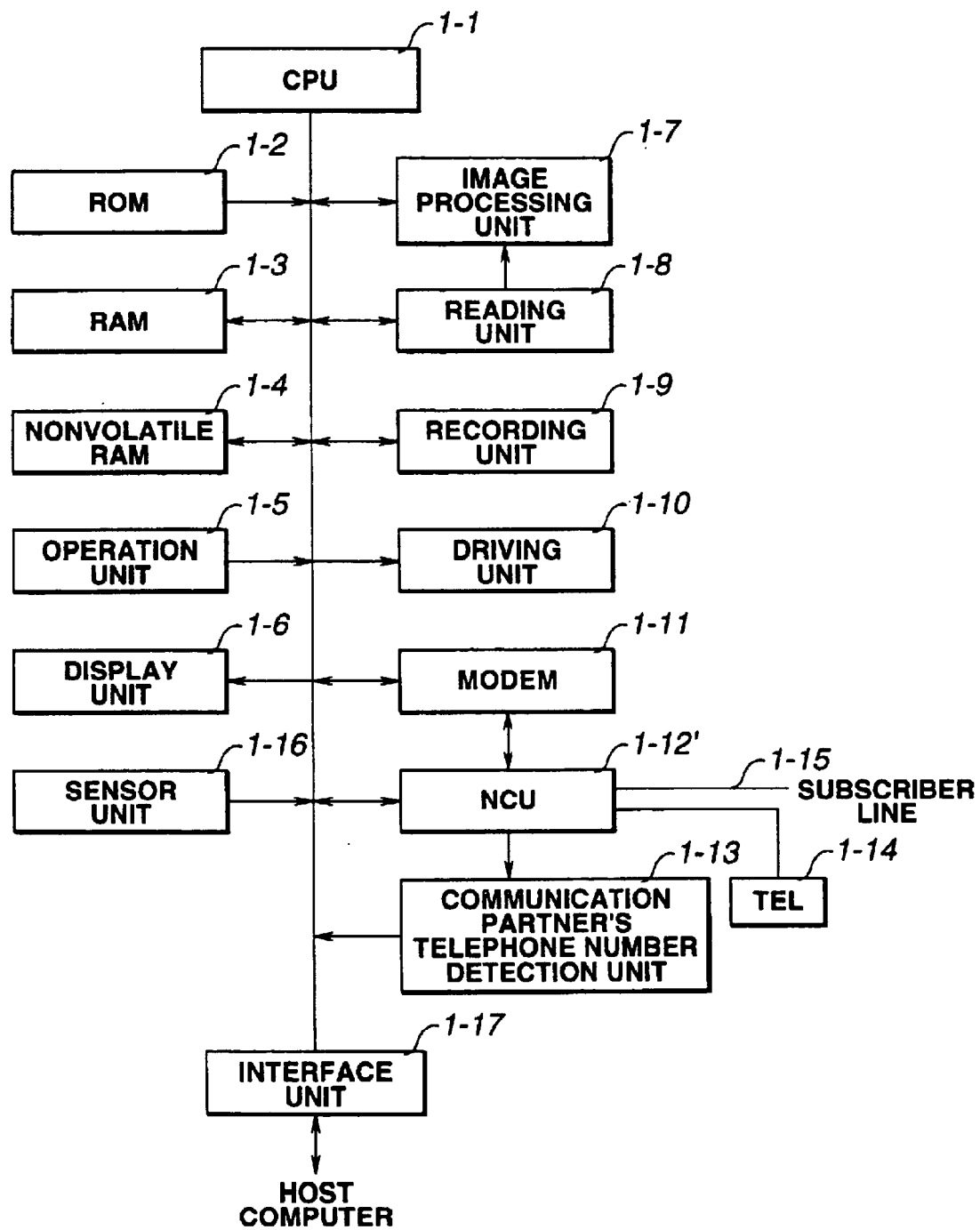
FIG. 6 is a block diagram illustrating the configuration of a facsimile apparatus according to a second embodiment of the present invention.

FIG. 6 is a block diagram illustrating the configuration of a facsimile apparatus, in which an interface unit 1-17 is added to the configuration of the facsimile apparatus shown in FIG. 1, according to a second embodiment of the present invention.

The interface unit 1-17 comprises an ordinary serial interface, or a bidirectional parallel interface (conforming to IEEE 1284 standards). The interface unit 1-17 connects the facsimile apparatus to the host computer via a driver buffer, connectors, connecting cables and the like, and can automatically output a list of call-receiving operations to the host computer at a preset time. The interface unit 1-17 can also arbitrarily obtain data of recording of call-receiving operations stored in the nonvolatile RAM 1-4 within the facsimile apparatus according to an operation from the host computer. The interface unit 1-17 also has the function of detecting if a data terminal, such as a PC (personal computer) or the like, has been connected thereto.

The configuration of the facsimile apparatus of the second embodiment has now been described.

Figure 7:
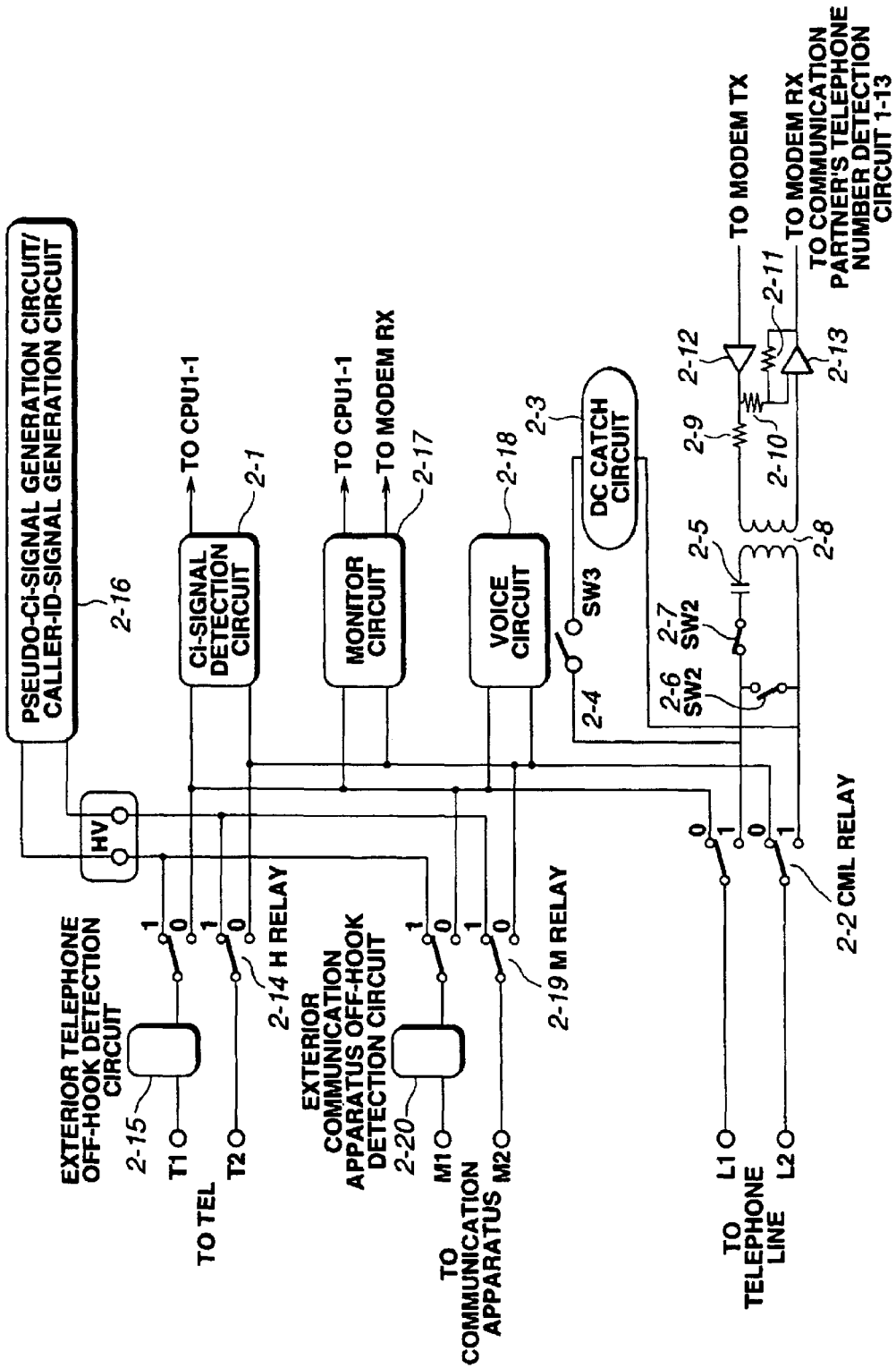
FIG. 7 is a block diagram illustrating the detailed configuration of an NCU shown in FIG. 6.

FIG. 7 is a block diagram illustrating the detailed configuration of an NCU 1-12' shown in FIG. 6.

In FIG. 7, reference numeral 2-1 represents a circuit for detecting a Ci signal indicating a call-receiving operation from the switchboard. Upon detection of a Ci signal, the circuit 2-1 notifies the CPU 1-1 of the fact. A CML relay 2-2 switches the line to the telephone set 1-14 or the modem 1-11. A DC catch circuit 2-3 catches the line by detecting the DC component of a signal. A switch 2-4 switches between execution/non-execution of DC catch of the line. Reference numeral 2-5 represents a DC-cut capacitor for catching the line by detecting the AC component of a signal. A switch SW1 2-6 generates a dial pulse. A switch SW2 2-7 separates an L component when generating a dial pulse. A transformer 2-8 divides the line into a primary side and a secondary side. There are also shown resistors 2-9, 2-10 and 2-11, and operational amplifiers 2-12 and 2-13. A switch 2-14 separates the telephone set from the line. A circuit 2-15 detects an off-hook state of the telephone set. A pseudo-Ci-signal generation circuit 2-16 generates a Ci signal to the telephone set and an exterior communication apparatus. A circuit 2-17 monitors a CNG/tone signal. A voice circuit 2-18 transmits a voice message to a sub-telephone set. A switch 2-19 separates the exterior communication apparatus from the line. A circuit 2-20 detects an off-hook state of the exterior communication apparatus.

Next, the operation of the second embodiment will be described with reference to the circuit diagram shown in FIG. 7 and the flowcharts shown in FIGS. 8 and 9.

In step S-1, the facsimile apparatus of the second embodiment switches off the switches SW1, SW2 and SW3 shown in FIG. 7, and initializes the CML relay, and the H relay and the M relay to the side [0] and to the side [1], respectively. Thus, even if a Ci signal arrives from the line, the ringer of the communication apparatus and the connected telephone do not ring, and other connected communication apparatuses do not respond either.

If it has been determined in step S-1 that a Ci signal from the line has been detected, the process proceeds to step S-3, where the switch SW-2 is switched on. If it has been determined in step S4 that the Ci signal has ended, the process proceeds to step S5, where the CML relay is switched to the side [1] to connect the communication partner's telephone number detection circuit to the line. In step S6, the detection of the communication partner's telephone number is started. Then, if it has been determined in step S7 that the communication partner's telephone number has been detected by the communication partner's telephone number detection circuit. If the result of the determination in step S7 is affirmative, the process proceeds to step S8, where the detected data is stored in the RAM 1-3.

The process then proceeds to step, U-1, where it is determined if the detected telephone number is the number of a facsimile communication terminal. If the result of the determination in step U-1 is affirmative, the process proceeds to step U-2, where the CML relay is turned on. In the next step U-3, known facsimile reception is performed, and the process returns to the standby state.

If the result of the determination in step U-1 is negative, the process proceeds to step U-4, where it is determined if the detected telephone number coincides with a communication partner's telephone number registered in the RAM 1-4. If the result of the determination in step U-4 is affirmative, the process proceeds to step U-5, where a pseudo-Ci signal for allowing the user to recognize that the call-receiving operation is from the telephone of a "registered communication terminal" is transmitted from the pseudo-Ci-signal generation circuit 2-16, and the telephone set 1-14 is ringed.

If the result of the determination in step U-4 is negative, the process proceeds to step U-6, where it is determined if an exterior communication apparatus (data terminal) is connected to the interface unit 1-17. If the result of the determination in step U-6 is negative, the process proceeds to step U-7, where the process returns to the standby state of the apparatus.

If the result of the determination in step U-6 is affirmative, the process proceeds to step U-8, where the caller's telephone number detected in steps S-7 and S-8 is transferred to the data terminal (PC) via the interface of the interface unit 1-17.

After transferring the caller's telephone number to the PC, in step U-9, the M relay and the CML relay are switched to the sides [0] to connect the telephone lines L1 and L2 to the M1 and M2, respectively.

Then, in step U-10, it is determined if a CNG signal has been detected by the monitor circuit, and in step U-11, it is determined if the end of the communication by the external communication apparatus has been detected by the exterior communication appartus off-hook detection circuit 2-20. If the result of the determination in step U-10 is affirmative, the process proceeds to step U-2 and then to step U-3, where known facsimile communication is performed. If the result of the determination in step U-10 is negative and the result of the determination in step U-11 is affirmative, the process proceeds to step U-12, where the process returns to the standby state of the apparatus.

The operation of the second embodiment has now been described.

Figure 8:
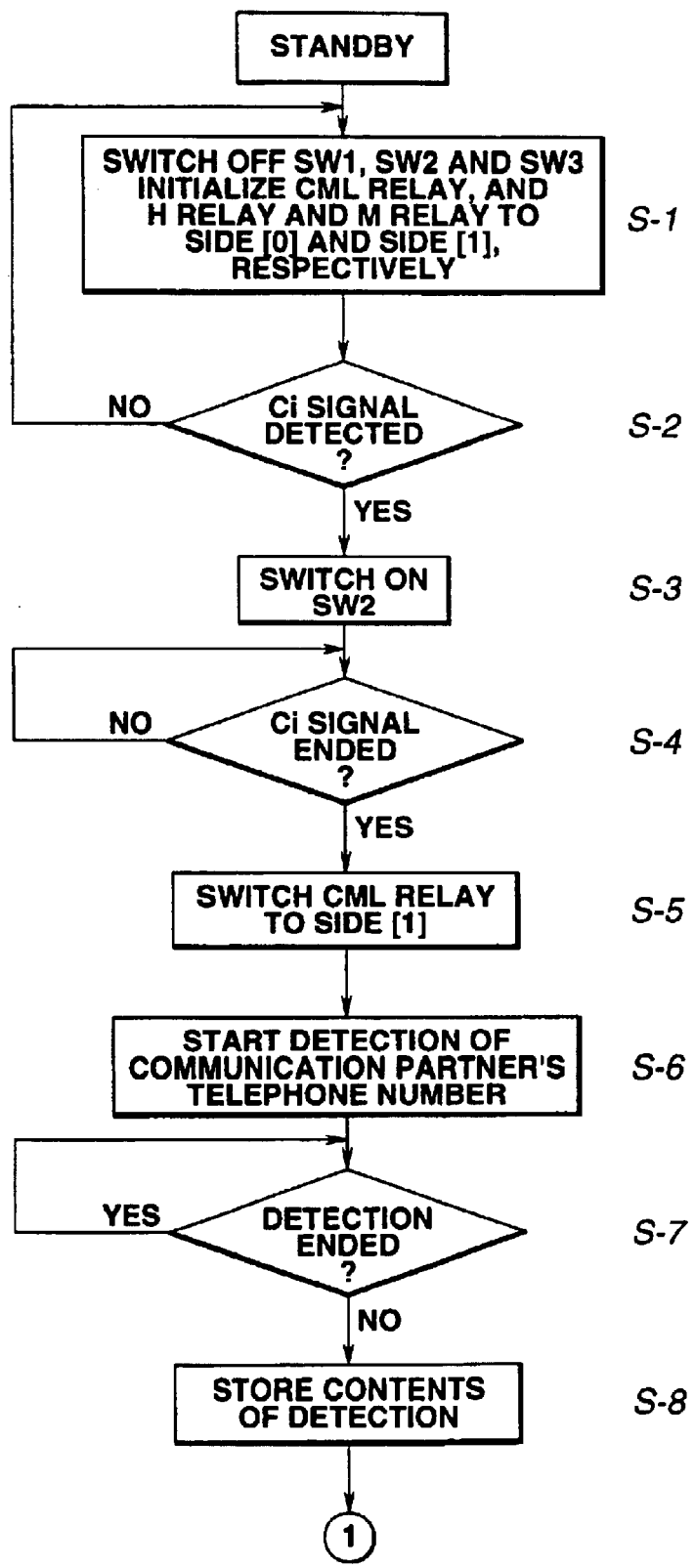
FIGS. 8 and 9 are flowcharts illustrating operations in the second embodiment.
Figure 9:
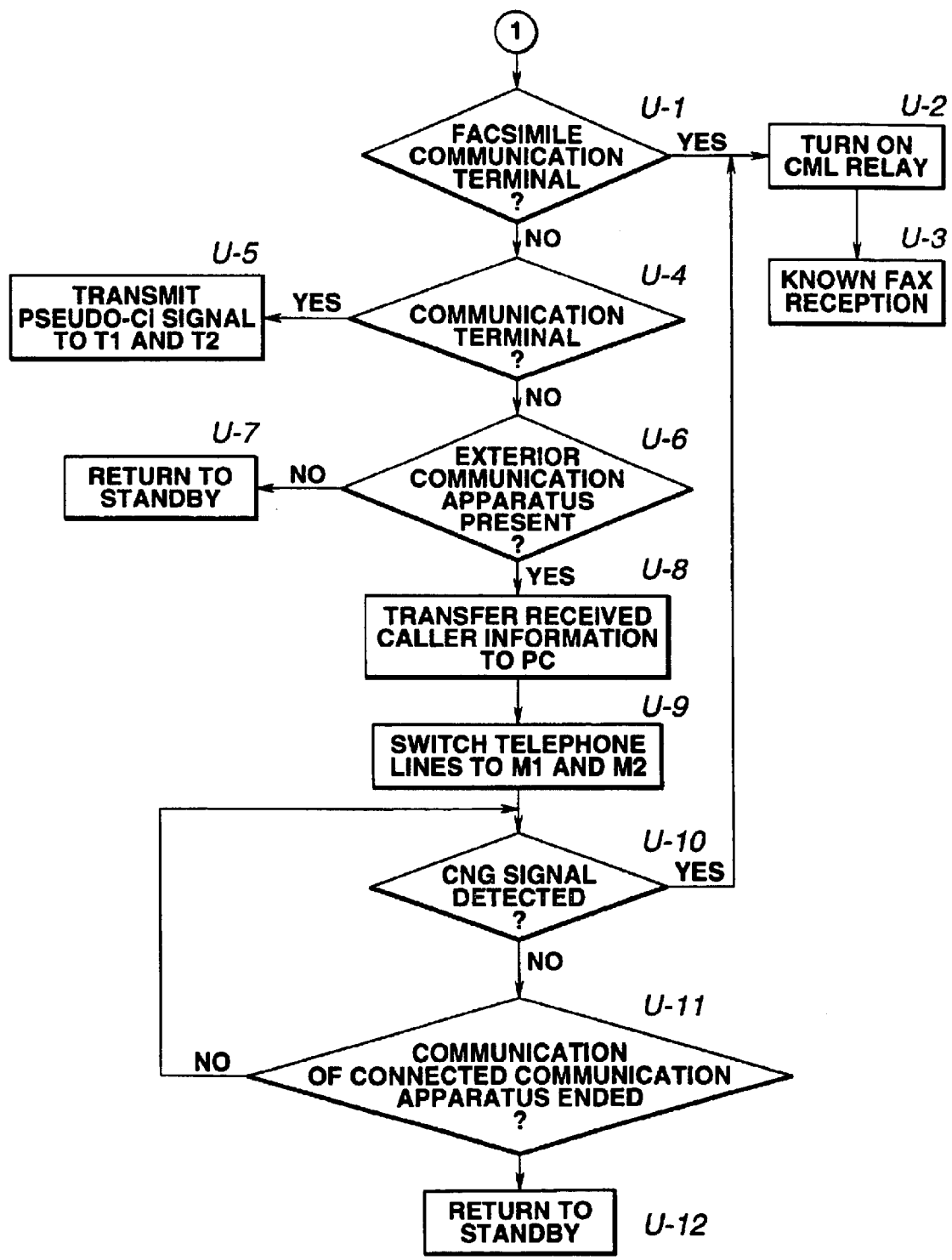
Figure 10:
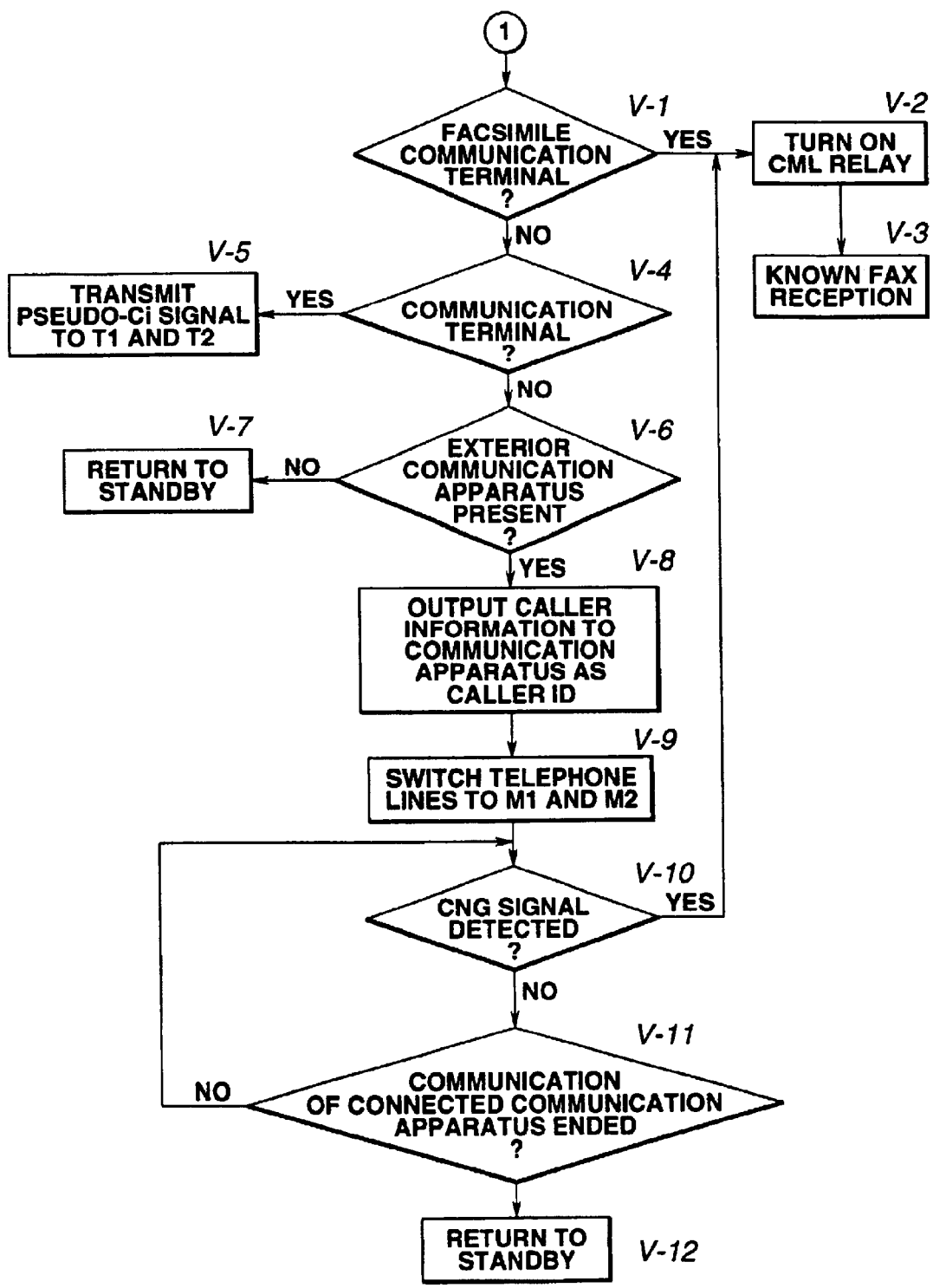
FIG. 10 is a flowchart illustrating operations in a modification of the second embodiment.

When a communication apparatus having means for detecting a caller's identification information is connected as the exterior communication apparatus, instead of transferring the caller's telephone number to the PC using the interface of the interface unit 1-17 in step U-8 shown in FIG. 9, as shown in step V-8 of FIG. 10, the information stored in step S-8 shown in FIG. 8 may be transmitted in the form of a caller ID signal generated by the pseudo-Ci-signal generation circuit/caller-ID-signal generation circuit 2-16 which is similar to the signal from the exchange network.

Figure 11:
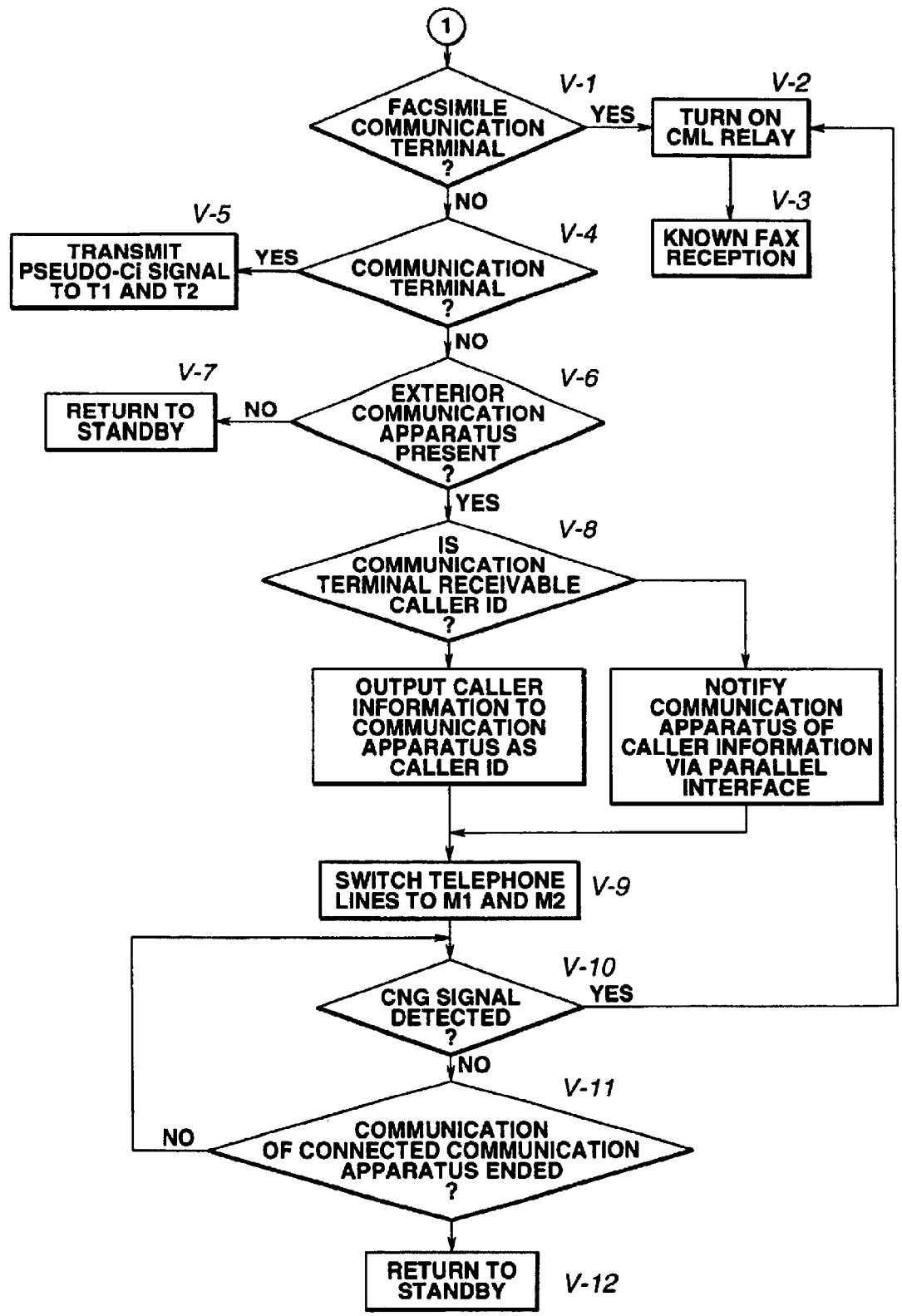
FIG. 11 is a flowchart illustrating operations in another modification of the second embodiment.

FIG. 11 illustrates a partial modification of the second embodiment. In FIG. 11, it is determined in step W-8 if the exterior communication apparatus can receive a caller ID signal. One of the operations in steps W-9 and W-10 is selected depending on the result of the determination in step W-8.

According to the second embodiment, even a terminal which does not have the function of detecting identification information of the caller from the switched network can identify the caller, and another terminal can identify the caller even after the facsimile apparatus has responded to a call-receiving operation.

Furthermore, when another terminal is connected, the facsimile apparatus notifies the other terminal of the detected identification information of the caller. Hence, a useless notification operation is prevented.

The individual components shown in outline or designated by blocks in the drawings are all well known in the communication apparatus arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as o encompass all such modifications and equivalent structures and functions.

What is claimed is:

1. A data communication apparatus, connectable to a line of an exchange network, having a function of notifying of identification information of a caller, and a function of sharing the line with another terminal connected to said data communication apparatus, said data communication apparatus comprising:

a line connection unit, adapted to connect the line to said data communication apparatus itself or the other terminal in accordance with a call-receiving operation from the exchange network;

a detection unit, adapted to detect identification information of a caller after connecting to the line;

a storage unit, adapted to store the identification information detected by said detection unit;

a determination unit, adapted to determine whether data communication by said data communication apparatus itself is to be performed, or whether communication by the other terminal is to be performed, in response to the call-receiving operation; and a processor, adapted to control communication without transferring to the other terminal the identification information of the caller stored in said storage unit after connecting said data communication apparatus itself to the line, when communication by said data communication apparatus itself is to be performed, and, when communication by the other terminal is to be performed, to transfer to the other terminal the identification information of the caller stored in said storage unit before connecting the other terminal to the line, wherein said processor is adapted to, when communication by the other terminal is to be performed, transfer to the other terminal the identification information of the caller stored in said storage unit before connecting the other terminal to the line by a pseudo-Ci-signal which is similar to the signal from the exchange network.

2. A communication apparatus according to claim 1, further comprising a detector, adapted to detect a connection of the other terminal, wherein, when the other terminal is detected as not being connected, said processor does not transfer to the other terminal the identification information.

3. A communication apparatus according to claim 1, further comprising an interface, adapted to perform communication of data in accordance with a predetermined handshake, wherein said processor transfers to the other terminal the identification information via said interface.

4. A communication apparatus according to claim 1, further comprising a generator, adapted to generate pseudo-identification information having a same form as the identification information of the caller from the exchange network, wherein said generator generates the pseudo-identification information in accordance with the identification information detected by said detection unit, and outputs the pseudo-identification information to the other terminal.

5. A communication apparatus according to claim 3, further comprising a switch, adapted to connect the line to the other terminal.

6. A communication apparatus according to claim 1, wherein said processor is a single processor.

7. A data communication method of a data communication apparatus, which is connectable to a line of an exchange network, having a function of notifying of identification information of a caller, and having a function of sharing the line with another terminal connected to the data communication apparatus, said method comprising:

a connection step of connecting the line to the data communication apparatus or the other terminal in accordance with a call-receiving operation from the exchange network;

a detection step of detecting identification information of a caller after connecting to the line;

a storage step of storing the identification information detected in said detection step;

a determination step of determining whether data communication by the data communication apparatus itself is to be performed, or whether communication by the other terminal is to be performed, in response to the call receiving operation; and a processing step of using a processor to control communication without transferring to the other terminal the identification information of the caller stored in said storage step after connecting the data communication apparatus to the line, when communication by the data communication apparatus itself is to be performed, and, when communication by the other terminal is to be performed, using the processor to transfer to the other terminal the identification information of the caller stored in said storage step before connecting the other terminal to the line, wherein, in said processing step, when communication by the other terminal is to be performed, the processor is used to transfer to the other terminal the identification information of the caller stored in said storage step before connecting the other terminal to the line by a pseudo-Ci-signal which is similar to the signal from the exchange network.

8. A communication method according to claim 7, further comprising a second detection step of detecting a connection of the other terminal, wherein, when the other terminal is detected as not being connected, the identification information is not transferred to the other terminal.

9. A communication method according to claim 7, further comprising an interface step of performing communication of data in accordance with a predetermined handshake, wherein the identification information is transferred to the other terminal via an interface of the data communication apparatus.

10. A communication method according to claim 7, further comprising a generation step of generating pseudo-identification information having a same form as the identification information of the caller from the exchange network, wherein said generation step includes generating the pseudo-identification information in accordance with the identification information detected in said detection step, and outputting the pseudo-identification information to the other terminal.

11. A communication method according to claim 9, further comprising a switch step of connecting the line to the other terminal.

12. A communication method according to claim 7, wherein the processor is a single processor.

* * * * *

UNITED STATES PATENT AND TRADEMARK OFFICE
CERTIFICATE OF CORRECTION

PATENT NO.    : 6,853,712 B2
DATED         : February 8, 2005
INVENTOR(S)   : Hisashi Toyoda et al.

It is certified that error appears in the above-identified patent and that said Letters Patent is hereby corrected as shown below:

Column 4,
Lines 30 and 33, "reading unit 108," should read -- reading unit 1-8, --; and
Line 47, "108" should read -- 1-8 --.

Column 8,
Line 2, "the the" should read -- the --; and
Line 26, "RAM 104," should read -- RAM 1-4, --.

Column 9,
Line 53, "if it has been" should read -- it is --; and
Line 54, "that" should read -- whether --.

Column 11,
Line 7, "o" (fifth occurrence) should read -- to --.

Column 12,
Line 21, "call" should read -- call --.

Signed and Sealed this

Eighteenth Day of October, 2005

JON W. DUDAS
*Director of the United States Patent and Trademark Office*